US008291424B2

(12) United States Patent
McLean

(10) Patent No.: US 8,291,424 B2
(45) Date of Patent: Oct. 16, 2012

(54) METHOD AND SYSTEM OF MANAGING RESOURCES FOR ON-DEMAND COMPUTING

(75) Inventor: Adam Patrick McLean, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1123 days.

(21) Appl. No.: 11/945,897

(22) Filed: Nov. 27, 2007

(65) Prior Publication Data

US 2009/0138883 A1  May 28, 2009

(51) Int. Cl.
*G06F 9/46* (2006.01)
(52) U.S. Cl. ............................................ 718/104; 718/1
(58) Field of Classification Search .................. None
See application file for complete search history.

(56) References Cited

U.S. PATENT DOCUMENTS

| | | | | |
|---|---|---|---|---|
| 7,721,292 | B2* | 5/2010 | Frasier et al. ................. | 718/104 |
| 2004/0225711 | A1* | 11/2004 | Burnett et al. ................. | 709/201 |
| 2005/0034000 | A1* | 2/2005 | Lee ............................... | 713/320 |
| 2005/0102674 | A1* | 5/2005 | Tameshige et al. ........... | 718/100 |
| 2005/0149294 | A1* | 7/2005 | Gebhart ......................... | 702/186 |
| 2005/0198636 | A1* | 9/2005 | Barsness et al. .............. | 718/100 |
| 2006/0036743 | A1* | 2/2006 | Deng et al. .................... | 709/227 |
| 2006/0047813 | A1* | 3/2006 | Aggarwal et al. ............. | 709/226 |
| 2006/0184936 | A1* | 8/2006 | Abels et al. ....................... | 718/1 |
| 2006/0190944 | A1* | 8/2006 | Moon et al. ................... | 718/104 |
| 2006/0195845 | A1* | 8/2006 | Rhine ............................ | 718/102 |
| 2006/0224741 | A1* | 10/2006 | Jackson ......................... | 709/226 |
| 2006/0248372 | A1* | 11/2006 | Aggarwal et al. ................. | 714/4 |

* cited by examiner

*Primary Examiner* — Emerson Puente
*Assistant Examiner* — Dong Kim
(74) *Attorney, Agent, or Firm* — Novak Druce + Quigg LLP

(57) ABSTRACT

A method and system of managing resources for on-demand computing is provided. The system can include one or more pools having resources, and a provisioning manager in communication with the one or more pools. The provisioning manager can receive a request for a resource from the requestor and can obtain values for one or more categories associated with the resources. The values can be obtained for at least a portion of the resources. The one or more categories can be based on quantifiable properties associated with the resources. The provisioning manager can determine a priority score for each of the at least a portion of the resources. The provisioning manager can determine a resource from the at least a portion of the resources to be distributed to the requester, where the determination can be based at least in part on the priority score for the resource.

17 Claims, 2 Drawing Sheets

METHOD AND SYSTEM OF MANAGING RESOURCES FOR ON-DEMAND COMPUTING

FIELD OF THE INVENTION

This invention relates to on-demand computing, and particularly to managing resources for on-demand computing.

BACKGROUND OF THE INVENTION

Computer technology requirements vary and are often dynamic, especially over extended periods of time. Hard drive capacities, bus speeds, and processor speeds can double every few years. A user may require 10 gigabytes (GB) of storage capacity at the start of a business, which soon increases to a requirement of 1000 GB of storage when the business becomes successful.

On-demand or utility computing is a computing system or model that allocates computing resources or assets to an organization and its individual users on an as-needed basis to allow the organization to efficiently meet dynamic computing demands. For example, if a group of users is working with applications that demand a large amount of bandwidth, the on-demand computing system can allocate additional bandwidth specifically to this group, such as from a pool of resources that are not currently utilizing the bandwidth.

On-demand computing can provide for the packaging of the computing resources, such as computation and storage, as a metered service similar to a physical public utility. On-demand computing has the advantage of low initial cost to acquire hardware. Customers requiring very large computations or having a sudden peak in demand can also avoid the delays that would result from physically acquiring, assembling and/or implementing a large number of computer resources. For example, Internet hosting services have the capability to quickly arrange for the leasing of individual servers, such as to provision a bank of web servers to accommodate a sudden surge in traffic to a web site.

The distribution of resources from a pool of resources in on-demand computing is done using an identical hardware model. The identical hardware model attempts to satisfy the request for use of a resource by distributing the first available resource to the requestor that satisfies the hardware specifications. Typically, a pool owner has numerous configurations of similar hardware that are placed together into a heterogeneous pool of resources. However, distributing the resource from the pool based on the first resource to match approach, can result in lower overall utilization of resources from the pool. More powerful resources which are the first available assets may be distributed for jobs where less powerful resources could have been distributed. Subsequent requests for resources that require the more powerful resources can thus be limited by the inefficient use of the available resources from the pool.

A need exists for efficient use of resources from a pool of resources in an on-demand computing system. A need further exists for managing the distribution of resources from a pool of resources based at least in part on criteria associated with the resources, such as criteria established by the requestor, the pool owner and/or some other entity.

SUMMARY OF THE INVENTION

An on-demand computing system is provided in the exemplary embodiments that distributes resources from a pool of resources based upon criteria associated with the resources. The criteria can allow distribution of resources so that an increase in resource utilization is obtained.

In one exemplary embodiment, there is provided a method of provisioning resources from one or more pools of resources in an on-demand computing system. The method can include obtaining a request for a resource, establishing a plurality of categories associated with properties of the resources, obtaining values for the plurality of categories for at least a portion of the resources, weighting the values to provide a priority score, and determining a resource to be provisioned from the at least a portion of the resources based at least in part on the priority score.

In another exemplary embodiment, there is provided a system of managing resources for on-demand computing. The system can include one or more pools having resources, and a provisioning manager in communication with the one or more pools. The provisioning manager can receive a request for a resource from the requester and can obtain values for one or more categories associated with the resources. The values can be obtained for at least a portion of the resources. The one or more categories can be based on quantifiable properties associated with the resources. The provisioning manager can determine a priority score for each of the at least a portion of the resources. The provisioning manager can determine a resource from the at least a portion of the resources to be distributed to the requester, where the determination can be based at least in part on the priority score for the resource.

In another exemplary embodiment, there is provided a computer-readable storage medium in which computer-executable code is stored. The computer-executable code is configured to cause a computing device in which the computer-readable storage medium is loaded to execute the steps of: obtaining a request from a requester for use of a resource of a cluster of resources; obtaining values for one or more categories for at least a portion of the resources, where the one or more categories are associated with properties of the resources; weighting the values to provide a priority score, where the weighting is based at least in part on information provided by an owner associated with the cluster of resources; selecting a resource to be distributed from the at least a portion of the resources based at least in part on the priority score; and providing the requestor with use of the selected resource.

BRIEF DESCRIPTION OF THE DRAWINGS

Exemplary embodiments of the on-demand computing method and system will now be described, by way of example only, with reference to the accompanying drawings, in which.

DETAILED DESCRIPTION

The present disclosure, embodied in various examples, is directed to a method and system for managing resources or assets from a pool or cluster of resources or assets. The method and system can select resources for provisioning or distribution based upon criteria established by the user, the pool owner and/or some other entity to increase utilization efficiency for the pool. Exemplary embodiments will be explained in connection with various possible on-demand computing methods and systems. The detailed description is intended only to be exemplary. Exemplary embodiments are shown in FIGS. 1 and 2, but the present disclosure is not limited to the illustrated structure or application.

Figure 1:
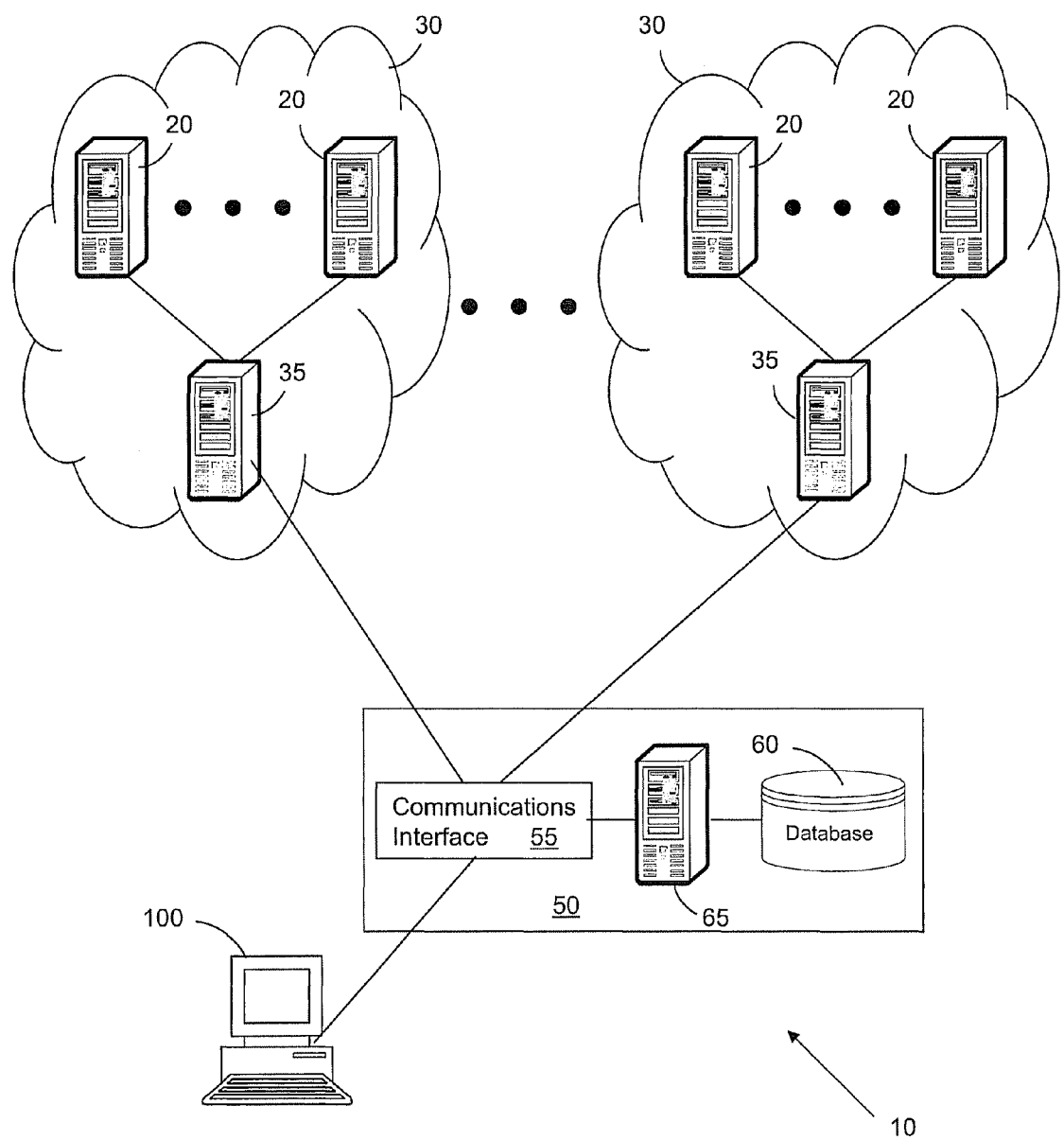
FIG. 1 is a schematic representation of an on-demand computing system according to an exemplary embodiment of the invention.
Figure 2:
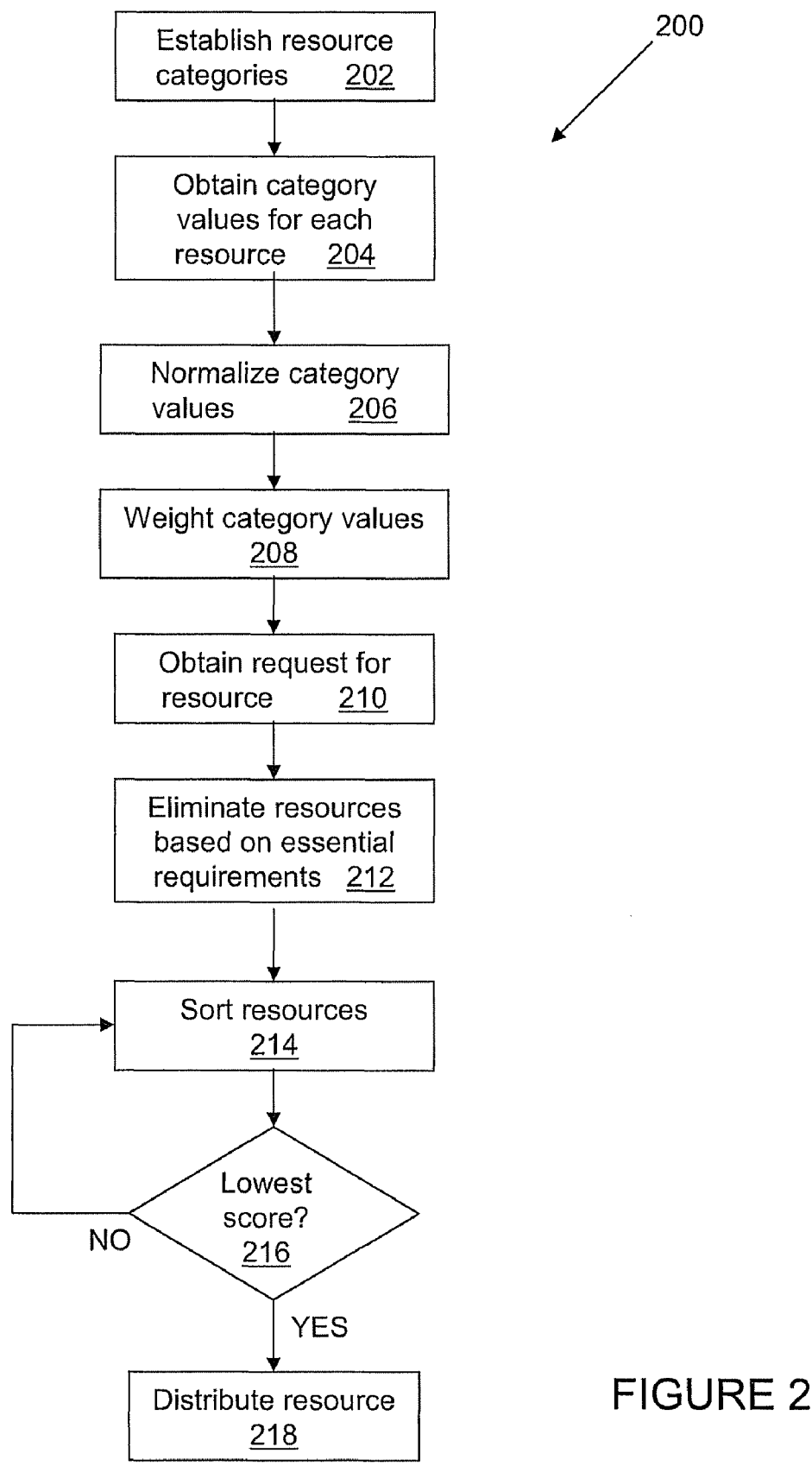
FIG. 2 is a flow chart illustrating a method of resource distribution utilizing the system of FIG. 1.

Referring to FIG. 1, an exemplary embodiment of an on-demand computing system according to aspects of the invention, is shown and generally represented by reference numeral 10. System 10 can include one or more resources or assets 20 that are grouped into one or more pools or clusters 30. The particular type, number and configuration of the resources 20 can vary. For example, the resources 20 can be similar hardware, such as servers, as well as other devices including storage devices, routers, multiplexers, gateways, and so forth. Resources 20 of system 10 are not limited to hardware, and can include bandwidth, specialized tasks, such as web services, and use of desired applications and/or operating systems. For example, the resources 20 can include processors that run Advanced Interactive eXecutive (AIX®) operating systems. Resources 20 can also be combinations of hardware and software.

The number and configuration of the resource pools 30 can also vary. For example, the system 10 can include a single resource pool 30 having multiple resources 20 or the system 10 can include multiple pools having the resources. In one embodiment, one or more of the pools 30 can have a single resource 20. Pools 30 can be located in proximity to each other, such as in a single facility, and/or can be geographically remote from each other.

System 10 can include virtualization so that the available amount of resources 20, such as storage or computing power, is larger than that of a single time-sharing computer. Multiple servers can be used on the back end to enable virtualization, such as a dedicated computer cluster or an under-utilized supercomputer. System 10 can also include distributed computing where a single algorithm or calculation is run on multiple resources 20. The distributed computing can include grid computing where the supporting nodes are geographically distributed or where the nodes cross administrative domains. The present disclosure also contemplates system 10 including a central server dispensing tasks to participating nodes at the request of approved end-users (e.g., paying customers). System 10 can also be more de-centralized, such as a virtual organization, with organizations buying and selling resources 20 as needed or as they go idle.

Distribution of the resources 20 to a requester or user 100 can be performed by a provisioning manager or network proxy 50. An example of a suitable provisioning manager 50 is the Tivoli® Provisioning Manager from IBM® that can enable on-demand computing through software, server, storage and network automation. The present disclosure contemplates other devices and applications being used for the provisioning manager 50.

Provisioning manager 50 can include a communications interface 55 that utilizes common technology for communicating with requester 100, such as over a network including the Internet. By way of the communications interface 55, the provisioning manager 50 can direct by common means access to, and distribution of, one or more selected resources 20 from one or more pools 30. Provisioning manager 50 can further include a memory 60 (such as a high capacity storage medium) embodied in this illustration as a database, and a controller 65 that makes use of computing technology, such as a desktop computer or scalable server, for controlling operations of the provisioning manager.

In one embodiment, the memory 60 of the provisioning manager 50 can include information or parameters associated with the resources 20 of the pools 30. The information can include Central Processing Unit (CPU) quantity, CPU generation, CPU speed, disk storage capacity, and/or real memory. The present disclosure contemplates the resource information describing other aspects of the resources 20, such as identification (e.g., owner and/or location), operating systems, available applications, previous usage, on-demand cost, and so forth. The memory 60 can also include information or parameters associated with the pools 30, including identification (e.g., owner and/or location), number of resources, type of resources, configuration of resources, distribution history, historical reliability data, and so forth. In another embodiment, the memory 60 can be a Change and Configuration Management DataBase (CCMDB) or a Data Change Management system (DCM). The CCMDB or DCM can be a separate system or device with which the provisioning manager 50 is in communication, and/or can be a system or device incorporated into the provisioning manager.

Provisioning manager 50 can communicate with the one or more pools 30 through a pool server 35. Server 35 can be used by a pool owner to communicate, store and/or prioritize resource categories or properties, as described more particularly below. The present disclosure also contemplates the provisioning manager 50 communicating directly with one or more of the resources 20 without the use of the pool server 35. A combination of the direct communication with one or more resources 20 and the communication via pool server 35 can also be utilized by system 10. In one embodiment, whether server 35 is used for communication with the resources 20 or whether direct communication is utilized, can be determined by the pool owner, the provisioning manager 50 and/or the requester 100.

In another embodiment, the requestor 100 can communicate directly with the server 35 without the use of the provisioning manager 50. Server 35 can include a communications interface that utilizes common technology for communicating with the requestor 100, such as over a network, including the Internet. Through use of a controller and a memory, the server 35 can direct the access to, and the distribution of, one or more selected resources 20 from the pool 30 to the requestor 100. The server 35 can include the resource information as described above, including one or more of the CPU quantity, CPU generation, CPU speed, disk storage capacity, real memory, identification (e.g., owner and/or location), operating systems, available applications, previous usage, and on-demand cost, and/or can include the pool information as described above, including one or more of the identification (e.g., owner and/or location), number of resources, type of resources, configuration of resources, distribution history, and historical reliability data. In another embodiment, the server 35 can be in communication with a system or device that stores resource and/or pool information, such as CCMDB or a DCM.

Referring additionally to FIG. 2, system 10 can utilize a prioritization method or process 200 to determine distribution of the one or more resources 20 to a requestor 100. Method 200 can be carried out by the provisioning manager 50, the server 35 or another entity. The present disclosure is not intended to be limited by the device or system carrying out the method 200. Method 200 is described herein with respect to a single heterogeneous pool 30 having a plurality of hardware resources 20.

Method 200 can begin with step 202 in which resource categories are established or selected for each of the resources 20 in the pool 30. The resource categories can be established by the pool owner and can include CPU quantity, CPU generation, CPU speed, disk storage capacity, and/or real memory. Other resource categories may also be established or selected, including properties associated with the resources that are quantifiable and/or non-quantifiable. For example, CPU speed can be quantified with gigahertz, while location, security or identity may not be quantifiable. In one embodiment, typically non-quantifiable properties can be assigned values such as ratings based upon preferred criteria. For example, locations in the United States can receive one rating and locations outside of the United States can receive another score. The present disclosure also contemplates the resource categories being established by an entity other than the pool owner, such as the provisioning manager 50 and/or the requester 100, or being established by an entity other than the pool owner in combination with the pool owner, such as through establishing all categories identified by the different entities or establishing only those categories that have been similarly identified by the different entities. In one embodiment, a number of categories can be established, while only a portion of those categories are utilized by method 200 for determining the resource that is to be distributed or provisioned to the requestor 100. For example, the provisioning manager 50 may choose to include CPU quantity, CPU generation, CPU speed, disk storage capacity, and real memory as resource categories, while excluding location and identity as resource categories. The determination to utilize only a portion of the resource categories can be based upon a number of factors, such as the identity of the particular requester 100. In one embodiment, by utilizing only a portion of the established resource categories, method 200 can reduce processing time for the distribution of the resources 20.

In step 204, values for the resource categories are obtained for each of the resources 20 of the pool 30. The values can be retrieved from various sources, including the memory 60 of the provisioning manager 50, a CCMDB or a DCM. For example, values associated with the resource categories of CPU quantity, CPU generation, CPU speed, disk storage capacity, and real memory can be obtained for a pool of five resources, as in Table 1:

| Hostname | CPU Quantity | CPU Generation | CPU Speed (Ghz) | Disk Storage (GB) | Real Memory (GB) |
|---|---|---|---|---|---|
| test1.torolab.ibm.com | 16 | 2 | 1.452 | 288 | 32 |
| test2.torolab.ibm.com | 2 | 1 | 1.002 | 288 | 8 |
| test3.torolab.ibm.com | 4 | 1 | 1.002 | 144 | 16 |
| test4.torolab.ibm.com | 8 | 2 | 1.904 | 576 | 32 |
| test5.torolab.ibm.com | 32 | 2 | 1.904 | 2304 | 256 |

The category values for each of the resources 20 can be normalized in step 206, such as based on a percentage of the maximum value for the category. The present disclosure also contemplates normalizing the values based on another comparator, such as the lowest category value. In step 208, each of the resource categories can be prioritized or weighted, and the normalized values adjusted to reflect the weighting, as in Table 2:

| Hostname | CPU Quantity | CPU Generation | CPU Speed (Ghz) | Disk Storage (GB) | Real Memory (GB) |
|---|---|---|---|---|---|
| test1.torolab.ibm.com | 50.00 | 80.00 | 61.01 | 2.50 | 6.25 |
| test2.torolab.ibm.com | 6.25 | 40.00 | 42.10 | 2.50 | 1.56 |
| test3.torolab.ibm.com | 12.50 | 40.00 | 42.10 | 1.25 | 3.13 |
| test4.torolab.ibm.com | 25.00 | 80.00 | 80.00 | 5.00 | 6.25 |
| test5.torolab.ibm.com | 100.00 | 80.00 | 80.00 | 10.00 | 50.00 |
| WEIGHT | 100 | 80 | 80 | 10 | 50 |

The weighting of the resource categories can be based on information provided by the pool owner, such as to differentiate the more important aspects of the resources 20 of the pool 30. A number of factors can be used to determine the weighting, including demand, cost, profitability and so forth. In one embodiment, the weighting of the resource categories can be done by an entity other than the pool owner, such as the provisioning manager 50 or requester 100, or can be done by an entity other than the pool owner in combination with the pool owner, such as through averaging the weighting provided by the different entities.

In step 208, the weighted value is used as the maximum priority score in the particular category. In the example of Table 2, the weighting of "100" in "CPU Quantity" provides the maximum quantity of CPUs (i.e., the 32-way CPU) with a value of 100.00, while lesser CPU values have a value of a percentage of the maximum weighting value, such as the 16-way CPU having a priority value of 50.00 and the 8-way CPU having a priority value of 25.00. Applying different weightings to the resource categories results in different weighted normalized values for each of the resources, such as where weightings are applied that focus on real memory, disk storage capacity and CPU speed, as in Table 3:

| Hostname | CPU Quantity | CPU Generation | CPU Speed (Ghz) | Disk Storage (GB) | Real Memory (GB) |
|---|---|---|---|---|---|
| test1.torolab.ibm.com | 5.00 | 50.00 | 61.01 | 10.00 | 12.50 |
| test2.torolab.ibm.com | 0.63 | 25.00 | 42.10 | 10.00 | 3.13 |
| test3.torolab.ibm.com | 1.25 | 25.00 | 42.10 | 5.00 | 6.25 |
| test4.torolab.ibm.com | 2.50 | 50.00 | 80.00 | 20.00 | 12.50 |
| test5.torolab.ibm.com | 10.00 | 50.00 | 80.00 | 80.00 | 100.00 |
| WEIGHT | 10 | 50 | 80 | 80 | 100 |

In the example of Table 3, the weighting of "10" in the CPU quantity category provides the maximum quantity of CPUs (i.e., the 32-way CPU) with a value of 10.00, while lesser CPU values have a value of a percentage of the maximum weighting value, such as the 16-way CPU having a priority value of 5.00 and the 8-way CPU having a priority value of 2.50.

In step 210, the request or job can be retrieved or otherwise be obtained from the requester 100. As described above, the requester 100 can communicate the request to the provisioning manager 50, but the present disclosure contemplates the request being received from, or sent to, other entities. The request can include one or more essential or minimum requirements or thresholds that may or may not match the resource categories. For example, a request can be received from the requestor 100 that does not specify any essential requirements with respect to the resource categories, but requires only that the resource can run the AIX® operating system, as in Table 4:

| | CPU Quantity | CPU Generation | CPU Speed (Ghz) | Disk Storage (GB) | Real Memory (GB) |
|---|---|---|---|---|---|
| Request 1 | no essential requirement | no essential requirement | no essential requirement | no essential requirement | no essential requirement |

In step 212, any resources 20 that do not meet the essential requirements can be eliminated. For the example of Table 4, there are no such essential requirements for the resource categories so all of the resources remain eligible for distribution. In step 214, the resources 20 are sorted based on the lowest priority score and a determination of a resource having a lowest priority score is made in step 216. For the example of Table 4 with the resources of Table 1 and the weighting of Table 2, the lowest priority score for the highest weighted category is "6.25" for the CPU quantity of test2.torolab.ibm.com. In step 218, this resource is then distributed or otherwise provisioned for use by the requester 100. If back in step 216, there is not a single resource with the lowest priority score then the next highest weighted category can be sorted and reviewed for the lowest priority score. For example, a second request can be received from the requestor 100 specifying essential requirements for the CPU quantity and real memory of the resource, as in Table 5:

|  | CPU Quantity | CPU Generation | CPU Speed (Ghz) | Disk Storage (GB) | Real Memory (GB) |
|---|---|---|---|---|---|
| Request 2 | 8 or more | no essential requirement | no essential requirement | no essential requirement | 32 or more |

Using the resources of Table 1 and the weighting of Table 3, the test2.torolab.ibm.com resource and test3.torolab.ibm.com resource are eliminated in step 212 because they do not meet the essential requirements for the CPU quantity and real memory categories. The lowest priority score for the highest weighted category in step 214 is "12.50" for the real memory category for both the test1.torolab.ibm.com resource and the test4.torolab.ibm.com resource. Since there is not a single lowest priority score as determined by step 216, method 200 can re-sort back in step 214 for the next highest weighted category and determine that "10.00" of the disk storage category or "61.01" of the CPU speed category for the test1.torolab.ibm.com resource are the lowest priority scores. If the weighting of Table 1 been used by method 200 for this second request, then the distributed resource would have been the test4.torolab.ibm.com resource based on its lowest priority score of "25.00" for the CPU quantity category.

The present disclosure also contemplates the use of other scoring or prioritizing techniques for method 200. For example, the weighting applied to each of the resource categories can be chosen from a total value of 100 as in Table 6:

| Hostname | CPU Quantity | CPU Generation | CPU Speed (Ghz) | Disk Storage (GB) | Real Memory (GB) | Total Score based on Weighted Criteria |
|---|---|---|---|---|---|---|
| test1.torolab.ibm.com | 17.5 | 20.00 | 15.25 | 0.63 | 2.50 | 55.88 |
| test2.torolab.ibm.com | 2.19 | 10.00 | 10.53 | 0.63 | 0.63 | 23.98 |
| test3.torolab.ibm.com | 4.38 | 10.00 | 10.53 | 0.31 | 1.25 | 26.47 |
| test4.torolab.ibm.com | 8.75 | 20.00 | 20.00 | 1.25 | 2.50 | 52.50 |
| test5.torolab.ibm.com | 35.00 | 20.00 | 20.00 | 5.00 | 20.00 | 100.00 |
| WEIGHT | 35 | 20 | 20 | 5 | 20 | =100 |

The lowest total priority score of a resource 20 based on all of the resource categories can then be utilized to select the resource for distribution. As an example, for request 2 of Table 5 using the resources of Table 1 and the weighting of Table 6, the distributed resource would be the test4.torolab.ibm.com resource with a lowest total priority score of "52.5", since the test2.torolab.ibm.com resource and test3.torolab.ibm.com resource were eliminated as not meeting the essential requirements of the request.

The exemplary embodiments of method 200 are described above with respect to a single pool 30 having a plurality of resources 20. The present disclosure also contemplates method 200 prioritizing or scoring resources from multiple pools. The same categories and/or weightings can be applied to each pool of resources, or different categories and/or weightings can be applied to different pools to determine the resource to be distributed.

The present disclosure also contemplates one or more steps of method 200 being performed in a different order. For example, the request may be obtained at the beginning of method 200 and the resource categories can be established or otherwise selected thereafter. In one embodiment, information associated with the request can be used to establish one or more of the resource categories.

In one embodiment, where more than one resource has the lowest priority score for the highest weighted category, other criteria can be used to determine which resource is to be distributed, such as frequency of use of the resource, lowest cost, processing load on or traffic to the pool or resource, and so forth. In another embodiment, where multiple pools are available for distribution of the resource 20, other criteria can be used to eliminate entire pools of resources, such as location, owner identity, security, and so forth. For example, the request for a resource 20 involving computations related to a trade secret may specify resource pools 30 that are not to be used, such as pools associated with a competitor. As another example, a request involving computations associated with national defense may specify that resource pools 30 must be located within the United States or have particular security requirements.

The present disclosure provides a method and system for selectively distributing or provisioning resources or assets from one or more pools or clusters of the resources or assets based upon categories or attributes deemed more important by the pool owner, the requester and/or some other entity. In the exemplary embodiments described above, a normalized and weighted priority score of each resource category for each resource in the pool can be used for the distribution determination. The resulting category values can provide a weighted priority order with which to respond to requests or jobs. The lowest scoring resources can be distributed so as to more efficiently utilize those resources, especially where subsequent requests or jobs require more powerful computing resources.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product. The computer program product can comprise a computer-readable storage medium in which is embedded a computer program comprising computer-executable code for directing a computing device or computer-based system to perform the various procedures, processes and methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

I claim:

1. A method of provisioning resources from a plurality of pools of resources in an on-demand computing system, the method comprising:
   obtaining a request for a resource;
   establishing a plurality of categories associated with properties of the resources;
   obtaining values for the plurality of categories for at least a portion of the resource categories;
   weighting the values to provide priority scores for the at least a portion of the resource categories, the weighting for each one of the at least a portion of the resources based at least in part on a combination of first weights provided by an owner of a one of the plurality of pools associated the one of the at least a portion of the resource categories and second weights provided at least one entity other than the owner;
   determining a resource to be provisioned from the at least a portion of the resource categories based at least in part on the priority scores; and
   if the priority scores for more than one of the at least a portion of the resource categories are the same, eliminating, prior to the determining, at least one of the plurality of pools of resource categories based at least in part on a criteria specified in the request that is different from the plurality of categories associated with the properties of the resources.

2. The method of claim 1, wherein the plurality of categories associated with the properties of the resources comprise at least one of Central Processing Unit (CPU) quantity, CPU speed, CPU generation, disk storage capacity and real memory.

3. The method of claim 1, further comprising:
   obtaining minimum requirements for the resource associated with the request; and eliminating each resource of the at least a portion of the resource categories from the determination of the resource to be provisioned that does not meet the minimum requirements.

4. The method of claim 1, further comprising normalizing each of the values.

5. The method of claim 4, wherein the determination of the resource to be provisioned is based at least in part on a lowest priority score for a highest weighted category of the plurality of categories.

6. The method of claim 1, wherein the combination of the first weights and the second weights comprises an average of the first weights and the second weights.

7. The method of claim 1, wherein the request for the resource is received by a provisioning manager and wherein the determination of the resource to be provisioned is made by the provisioning manager.

8. A system for providing on-demand computing to a requestor, the system comprising:
   a plurality of pools comprising resources; and
   a provisioning manager in communication with the plurality of pools,
   wherein the provisioning manager receives a request for a resource from the requestor,
   wherein the provisioning manager obtains values for one or more categories associated with the resources, the values being obtained for at least a portion of the resource categories, the one or more categories being based on quantifiable properties associated with the resources,
   wherein the provisioning manager determines a priority score for each one of the at least a portion of the resource categories based on a weighting of the values, the weighting for each one of the at least a portion of the resource categories based at least in part on a combination of first weights provided by an owner of a one of the plurality of pools associated the one of the at least a portion of the resource categories and second weights provided at least one entity other than the owner,
   wherein the provisioning manager determines the resource from the at least a portion of the resource categories to be distributed to the requestor, the determination of the resource being based at least in part on the priority score for the resource, and
   wherein the provisioning manager eliminates, prior to the determining, at least one of the plurality of pools of resources based at least in part on a criteria specified in the request that is different from the plurality of categories associated with the properties of the resources if the priority scores for more than one of the at least a portion of the resource categories are the same.

9. The system of claim 8, wherein the priority score is based on a weighting of the values that is provided by at least one of the provisioning manager, the requestor, and an owner associated with at least one of the one or more pools.

10. The system of claim 9, wherein the provisioning manager receives minimum requirements for the resource associated with the request and eliminates resource each of the at least a portion of the resource categories from the determination of the resource to be distributed that does not meet the minimum requirements.

11. The system of claim 9, wherein the one or more categories is a plurality of categories, wherein the provisioning manager normalizes each of the values, and wherein the determination of the resource to be distributed is based at least in part on a lowest priority score for a highest weighted category of the plurality of categories.

12. The system of claim 8, wherein the quantifiable properties comprise at least one of Central Processing Unit (CPU) quantity, CPU speed, CPU generation, disk storage capacity and real memory.

13. A non-transitory computer-readable storage medium in which computer-executable code is stored, the computer-executable code configured to cause a computing device in which the computer-readable storage medium is loaded to execute the steps of:

obtaining a request from a requestor for use of a resource of a cluster of resources;

obtaining values for one or more categories for at least a portion of the resource categories, the one or more categories being associated with properties of the resources;

weighting the values to provide a priority score for each one of the at least a portion of the resource categories, the weighting for each one of the at least a portion of the resource categories being based at least in part on combining first weights provided by an owner associated with the cluster of resources and second weights provided by an entity other than the owner;

selecting a resource to be distributed from the at least a portion of the resource categories based at least in part on the priority score;

if the priority scores for more than one of the at least a portion of the resource categories are the same, eliminating, prior to the selecting, at least a portion of the cluster of resources based at least in part on a criteria specified in the request that is different from the plurality of categories associated with the properties of the resources; and providing the requestor with use of the selected resource.

14. The non-transitory computer-readable storage medium of claim 13, further comprising computer-executable code for causing the computing device to obtain minimum requirements for the use of the resource associated with the request and to eliminate each resource of the at least a portion of the resource categories from the selection of the resource to be distributed that does not meet the minimum requirements.

15. The non-transitory computer-readable storage medium of claim 13, wherein the one or more categories is a plurality of categories and further comprising computer-executable code for causing the computing device to normalize each of the values and select the resource to be distributed based at least in part on a lowest priority score for a highest weighted category of the plurality of categories.

16. The non-transitory computer-readable storage medium of claim 15, further comprising computer-executable code for causing the computing device to establish the plurality of categories based at least in part on information provided by the owner associated with the cluster of resources.

17. The non-transitory computer-readable storage medium of claim 13, wherein the one or more categories associated with the properties of the resources comprise at least one of Central Processing Unit (CPU) quantity, CPU speed, CPU generation, disk storage capacity and real memory.

* * * * *